(12) United States Patent
Um et al.

(10) Patent No.: US 10,515,471 B2
(45) Date of Patent: Dec. 24, 2019

(54) APPARATUS AND METHOD FOR GENERATING BEST-VIEW IMAGE CENTERED ON OBJECT OF INTEREST IN MULTIPLE CAMERA IMAGES

(71) Applicant: Electronics and Telecommunications Research Institute, Daejeon (KR)

(72) Inventors: Gi Mun Um, Seoul (KR); Kee Seong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 300 days.

(21) Appl. No.: 15/648,533

(22) Filed: Jul. 13, 2017

(65) Prior Publication Data
US 2018/0225852 A1 Aug. 9, 2018

(30) Foreign Application Priority Data
Feb. 9, 2017 (KR) .................. 10-2017-0018231

(51) Int. Cl.
| | |
|---|---|
| *G06T 11/00* | (2006.01) |
| *G06T 11/60* | (2006.01) |
| *G06T 7/70* | (2017.01) |
| *G06T 7/11* | (2017.01) |
| *G06K 9/46* | (2006.01) |

(Continued)

(52) U.S. Cl.
CPC .......... *G06T 11/60* (2013.01); *G06K 9/00369* (2013.01); *G06K 9/00771* (2013.01); *G06K 9/4604* (2013.01); *G06T 7/11* (2017.01); *G06T 7/292* (2017.01); *G06T 7/66* (2017.01); *G06T 7/70* (2017.01); *G06T 2207/10016* (2013.01); *G06T 2207/10024* (2013.01); *G06T 2207/30196* (2013.01); *G06T 2207/30221* (2013.01)

(58) Field of Classification Search
None
See application file for complete search history.

(56) References Cited

U.S. PATENT DOCUMENTS

| | | | | |
|---|---|---|---|---|
| 10,021,313 | B1 * | 7/2018 | Chen | ............ H04N 5/265 |
| 2008/0247649 | A1 * | 10/2008 | Cheng | ............ G06T 7/12 |
| | | | | 382/190 |

(Continued)

FOREIGN PATENT DOCUMENTS

| | | | |
|---|---|---|---|
| JP | 2008-187678 | * | 8/2008 |
| KR | 10-1573794 B1 | | 12/2015 |
| KR | 10-2016-0095060 A | | 8/2016 |

OTHER PUBLICATIONS

H. Hong, et al, "A Best View Selection Method for Basketball Videos Focusing on Intrested Player with Multi-Cameras", Dec. 21, 2016 (4 pages in English and 4 pages in Korean).

(Continued)

*Primary Examiner* — Delomia L Gilliard
(74) *Attorney, Agent, or Firm* — NSIP Law

(57) ABSTRACT

Provided are an apparatus and method for generating a best-view image centered on a object of interest in multiple camera images. The apparatus and method for generating a best-view image centered on a object of interest in multiple camera images accurately provide a best-view image clearly showing a figure, a motion, or the like of a object of interest desired by a viewer by selecting the best-view camera image on the basis of a criterion of a judgment about the best-view image centered on the object of interest.

8 Claims, 4 Drawing Sheets

(51) Int. Cl.
*G06K 9/00* (2006.01)
*G06T 7/292* (2017.01)
*G06T 7/66* (2017.01)

(56) References Cited

U.S. PATENT DOCUMENTS

| | | |
|---|---|---|
| 2013/0188070 A1 | 7/2013 | Lee et al. |
| 2014/0056527 A1* | 2/2014 | Susanu ............... G06K 9/00228 |
| | | 382/195 |
| 2015/0116502 A1 | 4/2015 | Um et al. |
| 2015/0146922 A1* | 5/2015 | Kurokawa ............... G06K 9/68 |
| | | 382/103 |
| 2015/0163400 A1 | 6/2015 | Geiss et al. |
| 2016/0314596 A1* | 10/2016 | Yu .......................... H04N 5/247 |
| 2017/0161913 A1* | 6/2017 | Khazanov ........... H04N 5/23245 |
| 2018/0139374 A1* | 5/2018 | Yu ....................... H04N 5/23206 |
| 2018/0232592 A1* | 8/2018 | Stewart ............ G08B 13/19606 |
| 2018/0300540 A1* | 10/2018 | Swisher ................ G06N 3/0454 |
| 2018/0349705 A1* | 12/2018 | Kim ................... G06K 9/00744 |

OTHER PUBLICATIONS

L. Tessens, et al, "Principal View Determination for Camera Selection in Distributed Smart Camera Networks," Proceedings from the Second ACM/ IEEE International Conference on Distributed Smart Cameras, 1CDSC 2008, Sep. 2008. (10 pages, in English).

* cited by examiner

APPARATUS AND METHOD FOR GENERATING BEST-VIEW IMAGE CENTERED ON OBJECT OF INTEREST IN MULTIPLE CAMERA IMAGES

CROSS-REFERENCE TO RELATED APPLICATION

This application claims priority to and the benefit of Korean Patent Application No. 10-2017-0018231, filed on Feb. 9, 2017, the disclosure of which is incorporated herein by reference in its entirety.

BACKGROUND

1. Field of the Invention

The present invention relates to an apparatus and method for generating a best-view image centered on a object of interest in multiple camera images, and more particularly, to an apparatus and method for generating a best-view image centered on a object of interest in multiple camera images, which may accurately provide a best-view image clearly showing a figure, a motion, or the like of a object of interest desired by a viewer by selecting the best-view camera image on the basis of a criterion of a judgment about the best-view image centered on the object of interest.

2. Discussion of Related Art

These days, a sport game is relayed at various angles to vividly deliver sport scenes, and many cameras are used accordingly. Along with an increase in the number of cameras used in a sport game, it is difficult to instantly select a best view among numerous camera views when real-time editing is performed due to characteristics of sport games.

Thus far, much research has been conducted on methods of automatically selecting a best image among images of a sport game captured by several cameras. However, according to the existing methods, the best image is selected not by considering images having moving backgrounds but by considering only images having fixed backgrounds. Therefore, it is necessary to research a method of automatically selecting a best image among images having moving backgrounds.

According to research for selecting a best image among images having fixed backgrounds, silhouettes of players present in screens are extracted using a background subtraction algorithm and are used as elements for selecting the best image. However, unlike an image having fixed backgrounds, it is difficult to model a background in an image having moving backgrounds, and thus it is difficult to extract silhouettes of players using the background subtraction algorithm. Also, while locations of players in a sports ground may be derived from images having fixed backgrounds and are used as elements for selecting the best image, it is not possible to know locations of players in the sports ground from images having moving backgrounds in the same way.

A method used in a related art is not suitable to be used for an image having a moving background. As such a related art, there is a technology for selecting a best-view image from among images of a sport game, such as basketball, obtained by multiple cameras installed at fixed locations according to a quantified criterion in which the number of players in an image, amounts of activity, and locations in a sports ground are taken into consideration. As another related art, a technology for selecting a best-view image preferred by a viewer by giving a weight to whether there are players in multiple camera images or a location of a player in a sports ground has been proposed.

According to the related art, a criterion for selecting a best view is mainly defined by focusing on the overall scene composition of a camera image and an overall object movement, or whether an object is visible, and a best-view image is selected.

Therefore, according to the related art, when a best-view image is selected from multiple camera images acquired by focusing on a player object which a viewer is interested in, a criterion of selection centered on a object of interest is not proposed, and selecting a best view centered on the object of interest is problematic.

SUMMARY OF THE INVENTION

The present invention is directed to providing an apparatus and method for generating a best-view image centered on a object of interest in multiple camera images which may accurately provide a best-view image clearly showing a figure, a motion, or the like of a object of interest desired by a viewer by selecting the best-view camera image on the basis of a criterion of a judgment about the best-view image centered on the object of interest.

The present invention is also directed to providing an apparatus and method for generating a best-view image centered on a object of interest in multiple camera images which may collect only images clearly showing a object of interest by selecting a camera image clearly showing a figure or a movement of a interest person object as a best-view image from among images captured at various angles by multiple pan-tilt-zoom (PTZ) cameras tracking the object of interest in an environment in which many person object simultaneously move, such as a sport game or the like, and accurately generate and provide best-view images.

According to an aspect of the present invention, there is provided an apparatus for generating a best-view image centered on a object of interest in multiple camera images including: an object region detector configured to detect object regions in multiple camera images which are captured by multiple cameras tracking a object of interest; a object of interest identification section configured to identify the object of interest corresponding to a object of interest identifier (ID) among object in the detected object regions and extract object of interest regions; a judgment criterion value calculator configured to calculate best-view judgment criterion values for each frame according to the camera images with respect to the object of interest regions extracted by the object of interest identification section, calculate change amounts of object of interest regions between adjacent frames, and calculate best-view judgment criterion values based on inter-frame continuity; and an image selector configured to select best-view images according to image frames based on the calculated best-view judgment criterion values.

The judgment criterion value calculator may calculates one or more of an amount of activity based on silhouettes of the object of interest, a degree of face visibility of the object of interest, a degree of image blurring, and a degree of occlusion between the object of interest and another object as the best-view judgment criterion values, and the image selector may select the best-view images according to the image frames using a weighted sum of the calculated best-view criterion values.

The judgment criterion value calculator may extract the silhouettes of the object of interest from the extracted object of interest regions and calculate the amount of activity based on the silhouettes of the object of interest by overlapping silhouettes extracted during a preset time.

The judgment criterion value calculator may calculate the amount of activity based on the silhouettes of the object of interest using the number of white pixels and the number of grey pixels in a region in which the extracted silhouettes overlap.

The judgment criterion value calculator may detect whether there is a front face of the object of interest in the extracted object of interest regions using Haar features and calculate the degree of face visibility of the object of interest.

The judgment criterion value calculator may convert images including the extracted object of interest regions from a first color space to a second color space, extract hue pixel values from the converted color space, and calculate the degree of image blurring by calculating a difference in hue pixel values between adjacent frames.

The judgment criterion value calculator may set an overlap reference region based on an object silhouette and calculate a degree of occlusion between silhouettes of the object of interest and the other object in the extracted object of interest regions using the set overlap reference region.

The judgment criterion value calculator may determine that silhouettes of the object of interest and the other object overlap when it is determined that the other object overlaps the object of interest by determining which one of the object of interest and the other object is in front of the other.

The judgment criterion value calculator may extract silhouettes of the object of interest and the other object from each frame of the camera images and determine a time point at which center points of regions of other object other than the object of interest extracted from a previous frame are included in a silhouette region in which the extracted silhouettes of the object of interest and the other object merge together as an overlap-start time point.

The judgment criterion value calculator may determine a time point at which a center point of a region of the other object other than the object of interest is removed from a object of interest region of a previous frame among silhouette regions of object extracted from a current frame as an overlap-end time point.

According to another aspect of the present invention, there is provided a method of generating a best-view image centered on a object of interest in multiple camera images including: detecting object regions in multiple camera images captured by multiple cameras tracking a object of interest; identifying the object of interest corresponding to a object of interest ID among object in the detected object regions and extracting object of interest regions; calculating best-view judgment criterion values for each frame according to the camera images with respect to the extracted object of interest regions, calculating change amounts of object of interest regions between adjacent frames, and calculating the best-view judgment criterion values based on inter-frame continuity; and selecting best-view images according to image frames based on the calculated best-view judgment criterion values.

The calculating of the best-view judgment criterion values may include calculating one or more of an amount of activity based on silhouettes of the object of interest, a degree of face visibility of the object of interest, a degree of image blurring, and a degree of occlusion between the object of interest and another object as the best-view judgment criterion values, and the selecting of the best-view images may include selecting the best-view images according to the image frames using a weighted sum of the calculated best-view criterion values.

The calculating of the best-view judgment criterion values may include extracting the silhouettes of the object of interest from the extracted object of interest regions and calculating the amount of activity based on the silhouettes of the object of interest by overlapping silhouettes extracted during a preset time.

The calculating of the best-view judgment criterion values may include calculating the amount of activity based on the silhouettes of the object of interest using the number of white pixels and the number of grey pixels in a region in which the extracted silhouettes overlap.

The calculating of the best-view judgment criterion values may include detecting whether there is a front face of the object of interest in the extracted object of interest regions using Haar features and calculating the degree of face visibility of the object of interest.

The calculating of the best-view judgment criterion values may include converting images including the extracted object of interest regions from a first color space to a second color space, extracting hue pixel values from the converted color space, and calculating the degree of image blurring by calculating a difference in hue pixel values between adjacent frames.

The calculating of the best-view judgment criterion values may include setting an overlap reference region based on an object silhouette and calculating a degree of occlusion between silhouettes of the object of interest and the other object in the extracted object of interest regions using the set overlap reference region.

The calculating of the best-view judgment criterion values may include determining that silhouettes of the object of interest and the other object overlap when it is determined that the other object overlaps the object of interest by determining which one of the object of interest and the other object is in front of the other.

The calculating of the best-view judgment criterion values may include extracting silhouettes of the object of interest and the other object from each frame of the camera images and determining a time point at which center points of regions of other object other than the object of interest extracted from a previous frame are included in a silhouette region in which the extracted silhouettes of the object of interest and the other object merge together as an overlap-start time point.

The calculating of the best-view judgment criterion values may include determining a time point at which a center point of a region of the other object other than the object of interest is removed from a object of interest region of a previous frame among silhouette regions of object extracted from a current frame as an overlap-end time point.

BRIEF DESCRIPTION OF THE DRAWINGS

The above and other object, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
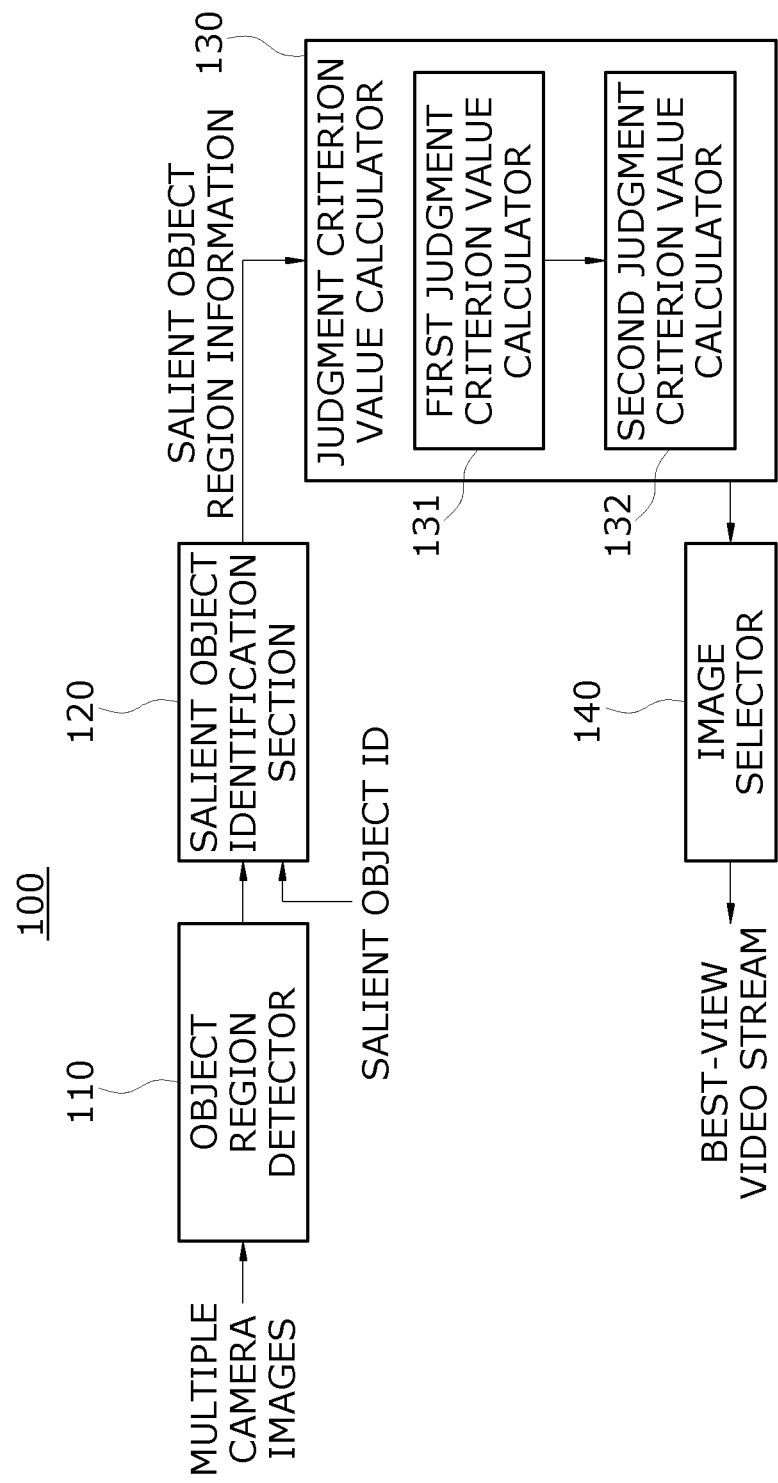
FIG. 1 is a block diagram of an apparatus for generating a best-view image centered on a object of interest in multiple camera images according to an exemplary embodiment of the present invention.

Hereinafter, exemplary embodiments of the present invention will be described with reference to the accompanying drawings. Exemplary embodiments will be described in detail focusing on parts necessary to understand an operation and action according to the present invention. A description of technical content that is well known in a technical field to which the present invention pertains and is not directly related to the present invention will be omitted when embodiments of the present invention are described. This is intended not to obscure the gist of the present invention but to convey the gist of the present invention more clearly by omitting unnecessary description.

When describing components of the present disclosure, components of the same name may be denoted by different reference numerals according to drawings, and may be denoted by the same reference numeral in spite of different drawings. However, this does not mean that the corresponding components have different functions according to embodiments or the same function in different embodiments even in this case, and functions of each component should be determined based on the description of each component in the corresponding embodiment.

FIG. 1 is a block diagram of an apparatus for generating a best-view image centered on a object of interest in multiple camera images according to an exemplary embodiment of the present invention.

As shown in FIG. 1, an apparatus 100 for generating a best-view image centered on a object of interest in multiple camera images according to an exemplary embodiment of the present invention includes an object region detector 110, a object of interest identification section 120, a judgment criterion value calculator 130, and an image selector 140.

The object region detector 110 detects object regions in multiple camera images which are captured by multiple cameras tracking a object of interest. Here, when the object of interest is a person, the object region detector 110 may detect person object regions in the multiple camera images.

The object of interest identification section 120 receives an input of a object of interest identifier (ID) corresponding to the object of interest. Then, the object of interest identification section 120 identifies the object of interest corresponding to the input object of interest ID among object in the object regions and extracts object of interest regions. In other words, the object of interest identification section 120 may receive an input of the object of interest ID and identify the object of interest among object in the detected object regions.

The judgment criterion value calculator 130 calculates best-view judgment criterion values for each frame according to camera images with respect to the object of interest regions extracted by the object of interest identification section 120, calculates change amounts of object of interest regions between adjacent frames, and calculates best-view judgment criterion values on the basis of inter-frame continuity.

The judgment criterion value calculator 130 may include a first judgment criterion value calculator 131 and a second judgment criterion value calculator 132.

The first judgment criterion value calculator 131 calculates best-view judgment criterion values according to frames/cameras, and the second judgment criterion value calculator 132 calculates best-view judgment criterion values on the basis of inter-frame continuity.

Meanwhile, to select a best-view image, the best-view image generation apparatus 100 calculates frame-specific best-view judgment criterion values by considering the following characteristics of the object of interest in an image.

The best-view image generation apparatus 100 finally defines a selection standard $BV_t^i$ of an overall best-view image using a weighted sum of the criterion values.

The best-view judgment criteria may include an amount of activity $S_t^i$ based on a silhouette of the object of interest, a degree of face visibility $F_t^i$ of the object of interest, a degree of image blurring $B_t^i$, and a degree of occlusion $O_t^i$ between the object of interest and another object.

Each of the best-view judgment criteria will be described below.

Figure 2:
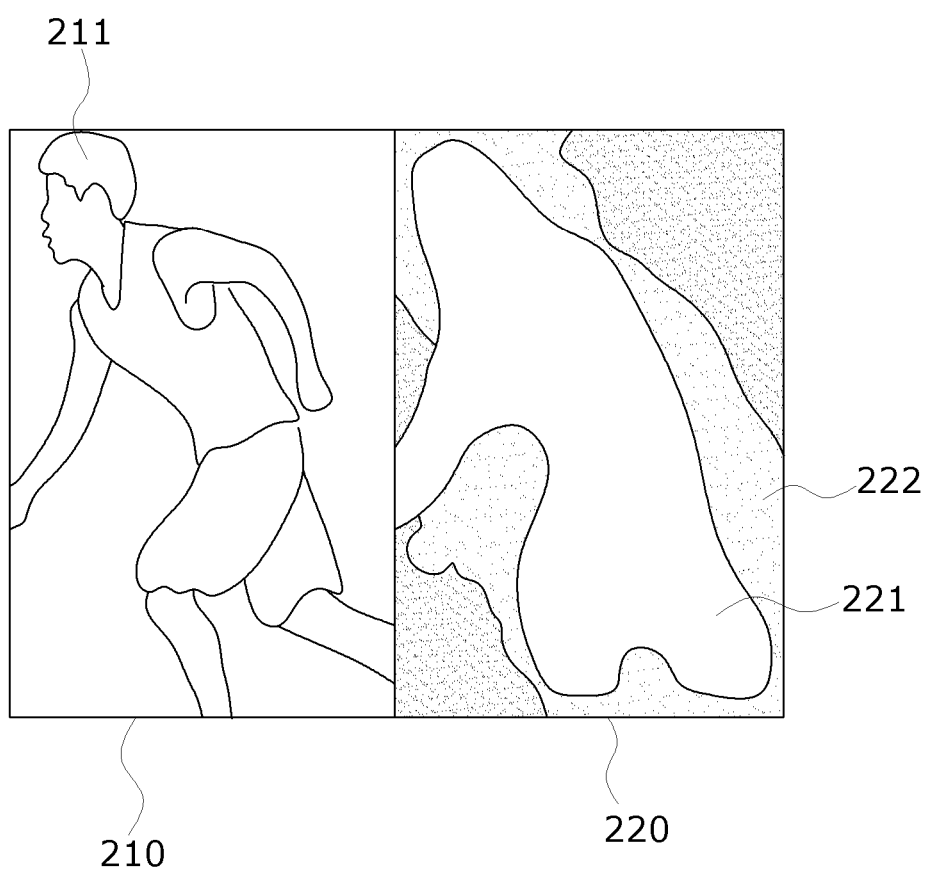
FIG. 2 is a diagram showing an amount of activity of a object of interest on the basis of a silhouette according to an exemplary embodiment of the present invention.

FIG. 2 is a diagram showing an amount of activity of a object of interest on the basis of a silhouette according to an exemplary embodiment of the present invention.

First, the amount of activity $S_t^i$ based on the silhouette of the object of interest will be described.

The judgment criterion value calculator 130 according to an exemplary embodiment of the present invention extracts silhouettes of the object of interest from object of interest regions extracted by the object of interest identification section 120 and calculates an amount of activity based on the silhouettes of the object of interest by overlapping silhouettes extracted during a preset time. Here, the amount of activity $S_t^i$ of the object of interest is calculated by extracting the silhouettes from the object of interest regions and overlapping the silhouettes corresponding to the preset time.

The object of interest may be a interest player, and FIG. 2 shows an example in which an amount of activity of a interest player 211 is expressed with silhouettes in an extracted object of interest region 210. Using an area of such a silhouette of a object of interest, an amount of activity of the object of interest is expressed by Equation 1 below.

$$S_t^i = \left(1 - \frac{N_w}{N_g + N_w}\right) \times 100 \qquad \text{[Equation 1]}$$

Here, $S_t^i$ denotes an amount of activity of the object of interest, $N_g$ denotes the number of white pixels, $N_w$ denotes the number of grey pixels, t denotes a time, and i denotes a camera number.

In this way, the judgment criterion value calculator 130 may calculate an amount of activity based on silhouettes of the object of interest using the number of white pixels 221 and the number of grey pixels 222 in a region in which the extracted silhouettes overlap.

Subsequently, the degree of face visibility $F_t^i$ of the object of interest being used as a judgment criterion will be described.

The judgment criterion value calculator 130 detects whether there is a front face of the object of interest in object of interest regions extracted by the object of interest identification section 120 using Haar features, and calculates a degree of face visibility of the object of interest. In other words, the degree of face visibility $F_t^i$ of the object of interest is calculated from whether there is a front face of a person in interest player regions using Haar features. While a line of sight of a person is used in a related art, the judgment criterion value calculator 130 according to an exemplary embodiment of the present invention determines a degree of face visibility. For example, the judgment criterion value calculator 130 may assign a face present value (e.g., 1) when a face is detected in a object of interest region, and may assign a face absent value (e.g., 0) otherwise.

Subsequently, the degree of image blurring $B_t^i$ being used as a judgment criterion will be described.

The degree of image blurring $B_t^i$ is not taken into consideration in a related art because cameras are fixed in most cases. According to an exemplary embodiment of the present invention, when capturing is performed with multiple cameras, such as pan-tilt-zoom (PTZ) cameras, changing their postures or zooming in or out, motion blur may occur due to rapid motions of the multiple cameras. The degree of image blurring $B_t^i$ is additionally defined as a judgment criterion so that the judgment criterion value calculator 130 may select an image having little motion blur in such a case.

The judgment criterion value calculator 130 converts an image including a object of interest region extracted by the object of interest identification section 120 from a first color space to a second color space and extracts hue pixel values from the converted color space. Specifically, to calculate a degree of image blurring, the judgment criterion value calculator 130 converts the image from a red, green, blue (RGB) color space to a hue, saturation, value (HSV) color space and then extracts only the hue pixel values.

Then, the judgment criterion value calculator 130 calculates the degree of image blurring by calculating differences in hue pixel value between adjacent frames. In other words, the judgment criterion value calculator 130 calculates a difference in hue pixel values between two adjacent frames and determines that the degree of blurring is greater when the difference is larger.

Figure 3:
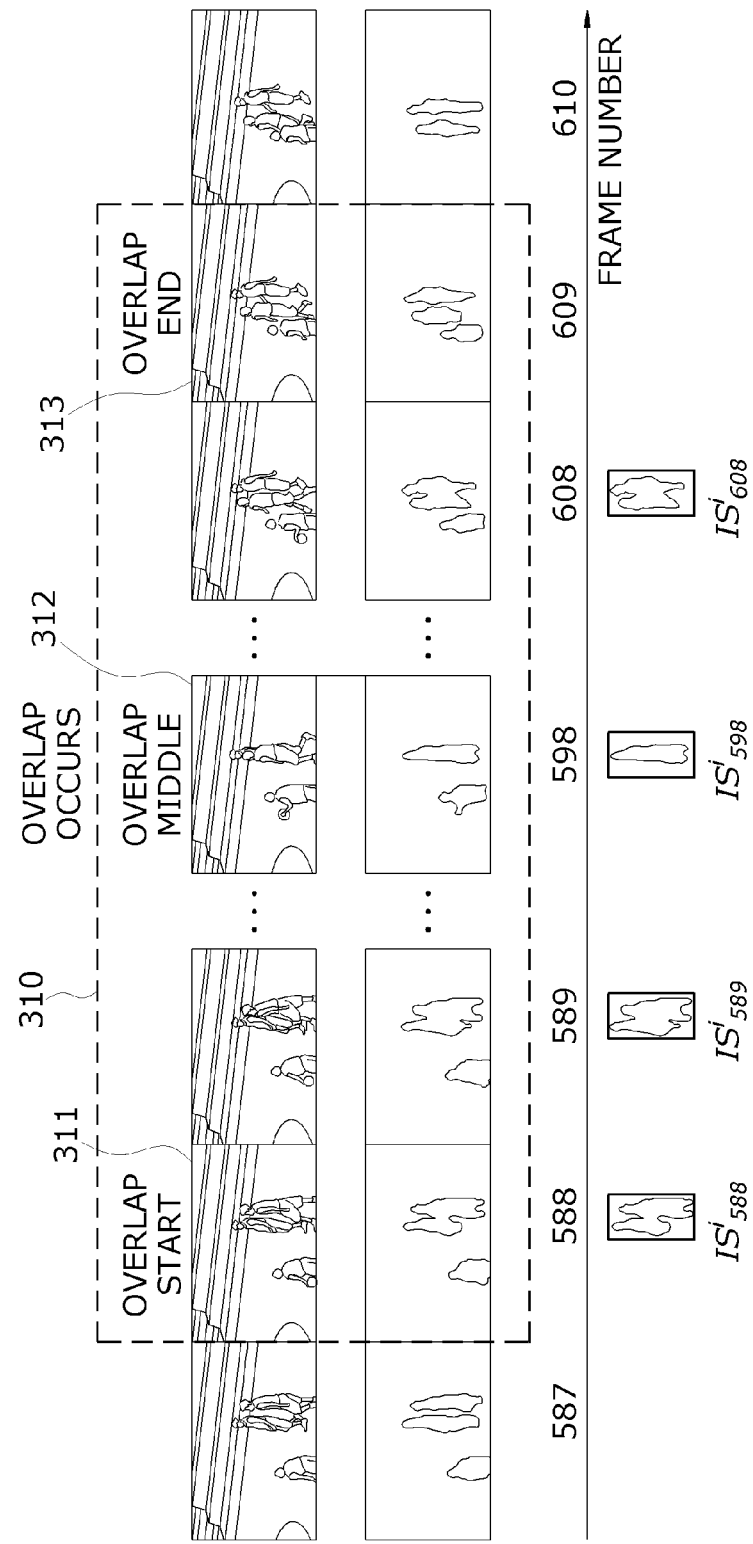
FIG. 3 is a diagram showing a calculation of a degree of occlusion between a object of interest and another object according to an exemplary embodiment of the present invention.

FIG. 3 is a diagram showing a calculation of a degree of occlusion between a object of interest and another object according to an exemplary embodiment of the present invention.

The degree of occlusion $O_t^i$ between the object of interest and another object being used as a judgment criterion will be described.

A technique of determining a degree of occlusion quantified on the basis of a standard rectangular region of a object of interest is modified and used to calculate the degree of occlusion $O_t^i$ between the object of interest and the other object. The judgment criterion value calculator 130 according to an exemplary embodiment of the present invention changes a reference region from a rectangular region to a region based on an object silhouette and determines a degree of occlusion between silhouettes of the object of interest and the other object. In other words, the judgment criterion value calculator 130 sets an overlap reference region on the basis of an object silhouette and calculates degrees of occlusion between the silhouettes of the object of interest and the other object in the extracted object of interest regions using the set overlap reference region.

Here, the judgment criterion value calculator 130 is used only when it is determined that the other object overlaps the object of interest by determining which one of the object of interest and the other object is in front of the other. In other words, when it is determined that the other object overlaps the object of interest by determining which one of the object of interest and the other object is in front of the other, the judgment criterion value calculator 130 may determine that the silhouettes of the object of interest and the other object overlap.

Such a degree of occlusion $O_t^i$ between the object of interest and the other object is a criterion for a case in which a distance between the object of interest and the other object is reduced and the object of interest and the other object appear to overlap according to a camera angle. The judgment criterion value calculator 130 extracts silhouettes of the object of interest and the other object from several frames of multiple camera images, and when two silhouettes merge together, a degree of occlusion is quantified as a criterion value of such a degree of occlusion.

First, $IS_t^i$ shown in FIG. 3 denotes a silhouette obtained when the object of interest and the other object overlap, and t and i denote time and a camera number, respectively.

An occurrence 310 of the object of interest and the other object overlapping corresponds to a case in which silhouettes of the object of interest and the other object merge together as shown in a 589$^{th}$ frame of FIG. 3. When center points of regions of other object other than the object of interest extracted from a previous frame are included in the merged silhouette region, it is determined that the other object and the object of interest overlap. In this way, the judgment criterion value calculator 130 may extract the silhouettes of the object of interest and the other object from each frame of camera images and determine a time point at which center points of regions of other object other than the object of interest extracted from the previous frame are included in a silhouette region in which the extracted silhouettes of the object of interest and the other object merge together as an overlap-start time point 311.

When the overlap-start time point 311 is determined, the judgment criterion value calculator 130 searches for an overlap-end time point 313. When a center point of a region of another object other than the object of interest is removed from an IS region of a previous frame among silhouette regions of object extracted from a current frame, the current frame is determined as the overlap-end time point 313. In this way, when a center point of a region of another object other than the object of interest is removed from a object of interest region of the previous frame among the silhouette regions of the object extracted from the current frame, the judgment criterion value calculator 130 may determine that the current frame is the overlap-end time point 313.

Meanwhile, an overlap-middle time point 312 is determined to be an intermediate time point between the overlap-start time point 311 and the overlap-end time point 313. The judgment criterion value calculator 130 calculates differences between ISs extracted until the overlap-middle time point 312 and an IS extracted at the overlap-start time point 311 and quantifies a degree of occlusion. After the overlap-middle time point 312, the judgment criterion value calculator 130 calculates differences from an IS extracted from a frame ahead of the overlap-end time point 313 and quantifies a degree of occlusion. A value obtained by quantifying a frame with such a degree of occlusion between the object of interest and another object may be expressed by Equation 2 below.

$$O_t^i = \left( \frac{|N_{IS_0^i} - N_{IS_t^i}|}{N_{IS_0^i}} \right) \times 100, \quad \text{[Equation 2]}$$

$$t_s < t < t_e,$$

$$p = \begin{cases} t_s, & t_s < t < t_m \\ t_e - 1, & t_m < t < t_e \end{cases}$$

Here, $O_t^i$ denotes a value obtained by quantifying a frame with a degree of occlusion between the object of interest and another object, $N_{IS}$ denotes the number of pixels of an IS, t denotes a time, $t_s$ denotes an overlap-start time point, $t_m$ denotes an overlap-middle time point, $t_e$ denotes an overlap-end time point, and i denotes a camera number.

As described above, the judgment criterion value calculator 130 may calculate at least one of an amount of activity based on silhouettes of the object of interest, a degree of face visibility of the object of interest, a degree of image blurring, and a degree of occlusion between the object of interest and another object as a best-view judgment criterion value.

Then, the image selector 140 selects best-view images according to image frames on the basis of best-view judgment criterion values calculated by the judgment criterion value calculator 130. Here, the image selector 140 may select the best-view images according to the image frames using a weighted sum of the calculated best-view criterion values.

An equation for finally selecting a best view on the basis of the four quantitative criteria defined as described above is expressed by Equation 3 below.

$$BV_t^i = S_t^i + F_t^i - B_t^i - O_t^i \quad \text{[Equation 3]}$$

Here, $BV_t^i$ denotes a quantitative criterion value for determining frame-specific best views, i denotes a camera number, and t denotes a frame number. $S_t^i$ denotes an amount of activity based on silhouettes of the object of interest, $F_t^i$ denotes a degree of face visibility of the object of interest, $B_t^i$ denotes a degree of image blurring, and $O_t^i$ denotes a degree of occlusion between the object of interest and another object.

On the basis of the calculated quantitative criterion value $BV_t^i$ for determining frame-specific best views, the image selector 140 selects a camera image having a highest value among multiple camera images as a best-view image.

Thus far, a process of calculating a best-view judgment criterion value among exemplary embodiments of the present invention has been described with reference to FIGS. 2 and 3. However, this is merely an exemplary embodiment for convenience of understanding and describing the present invention, and the present invention is not limited thereto.

Figure 4:
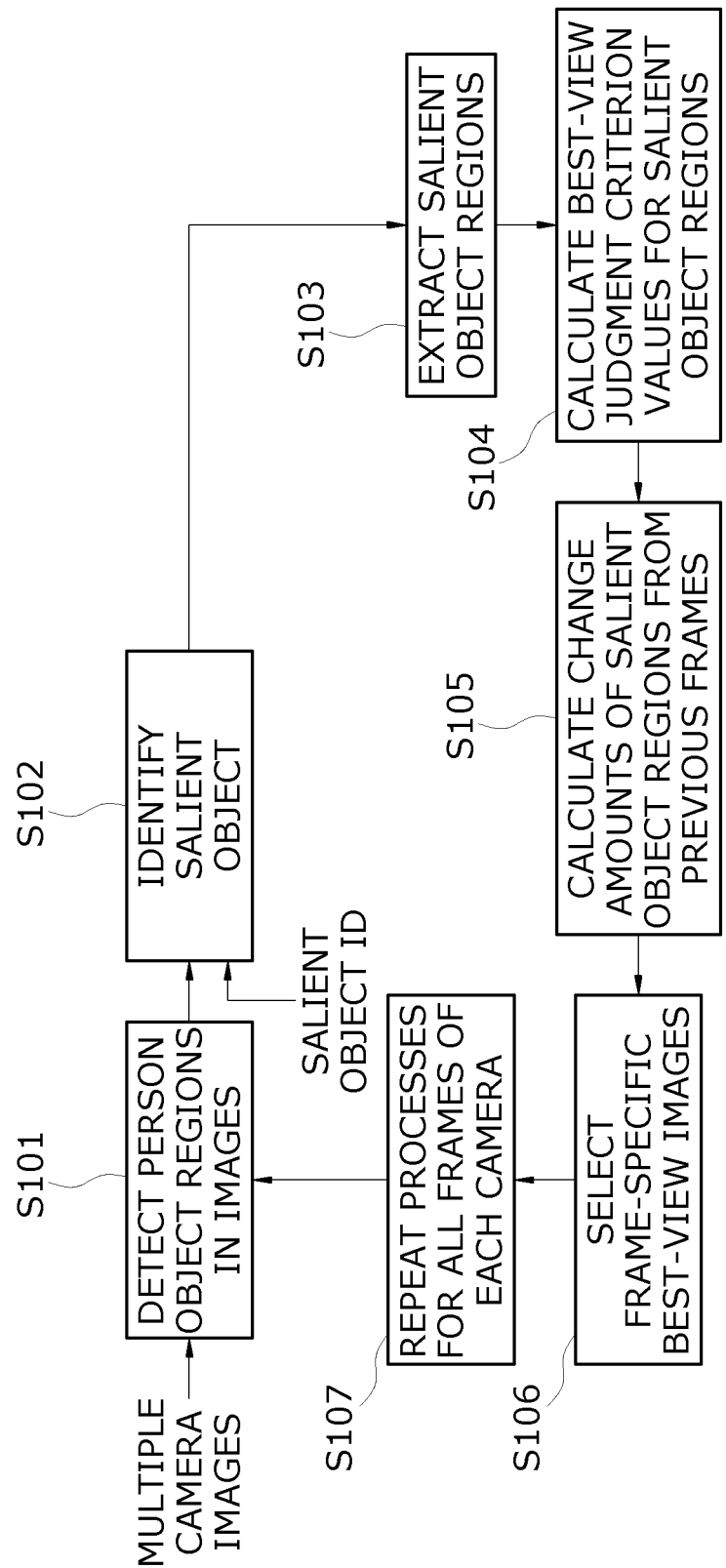
FIG. 4 is a flowchart of a method of generating a best-view image centered on a object of interest in multiple camera images according to an exemplary embodiment of the present invention.

FIG. 4 is a flowchart of a method of generating a best-view image centered on a object of interest in multiple camera images according to an exemplary embodiment of the present invention.

FIG. 4 shows an operational flowchart of a technique for generating a best-view image centered on a object of interest in multiple camera images according to an exemplary embodiment of the present invention.

First, multiple cameras are installed in a capturing location to acquire images at various angles. The multiple cameras may acquire multiple camera images centered on a object of interest by controlling PTZ cameras manually or on the basis of an object tracking result. The acquired multiple camera images are input to the best-view image generation apparatus 100.

Then, the best-view image generation apparatus 100 detects object regions in the multiple camera images which have been captured by the multiple cameras tracking the object of interest (S101). In other words, the best-view image generation apparatus 100 detects person object regions in the input multiple camera images according to the camera images.

Next, the best-view image generation apparatus 100 identifies the object of interest corresponding to a object of interest ID among object in object regions detected by the object region detector 110 (S102).

Subsequently, the best-view image generation apparatus 100 extracts object of interest regions including the identified object of interest (S103). In other words, the best-view image generation apparatus 100 receives an input of the object of interest ID, identifies the object of interest by applying the object of interest ID to the detected person object regions, and extracts the object of interest regions.

Subsequently, the best-view image generation apparatus 100 calculates best-view judgment criterion values for each frame according to camera images with respect to the object of interest regions extracted by the object of interest identification section 120 (S104).

Also, the best-view image generation apparatus 100 calculates change amounts of object of interest regions between adjacent frames and calculates best-view judgment criterion values on the basis of inter-frame continuity (S105). Here, the best-view image generation apparatus 100 may calculate at least one of an amount of activity based on silhouettes of the object of interest, a degree of face visibility of the object of interest, a degree of image blurring, and a degree of occlusion between the object of interest and another object as a best-view judgment criterion value.

Then, the best-view image generation apparatus 100 selects best-view images according to image frames on the basis of the calculated best-view judgment criterion values (S106). Here, the best-view image generation apparatus 100 may select the best-view images according to the image frames using a weighted sum of the calculated best view criterion values.

In this way, the best-view image generation apparatus 100 calculates best-view judgment criterion values according to camera image frames and a change amount of a object of interest region from a previous frame, and selects frame-specific best-view images.

The processes from S101 to S106 are repeated according to all frames of the multiple camera images (S107).

By repeating the processes, the best-view image generation apparatus 100 selects an image clearly showing a figure or a motion of a person which a viewer or a user is interested in as a best-view image from among the multiple camera images captured at various angles by the multiple cameras.

According to exemplary embodiments of the present invention, it is possible to accurately provide a best-view image clearly showing a figure, a motion, or the like of a object of interest desired by a viewer by selecting a best-view camera image on the basis of a criterion of a judgment about the best-view image centered on the object of interest.

According to exemplary embodiments of the present invention, it is possible to collect only images clearly showing a object of interest by selecting a camera image clearly showing a figure or a movement of a interest person object as a best-view image from among images captured at various angles by multiple PTZ cameras tracking the object of interest in an environment in which many person object simultaneously move, such as a sport game or the like, and accurately generate and provide best-view images.

According to a related art, a best-view camera image is selected on the basis of a criterion of a judgment about a best-view image centered on a scene, but according to exemplary embodiments of the present invention, a best-view camera image is selected on the basis of a criterion of a judgment about a best-view image centered on a object of interest. Therefore, it is possible to accurately provide a best-view image which clearly shows a figure, a motion, or the like of a object of interest desired by a viewer.

According to exemplary embodiments of the present invention, it is possible to automatically create a highlight video centered on a specific player in a sport game, or generate and provide images obtained by monitoring and recording a suspicious person in a video security system.

The above description of the present invention is exemplary, and those of ordinary skill in the art should appreciate that the present invention can be easily carried out in other detailed forms without changing the technical spirit or essential characteristics of the present invention. Therefore, exemplary embodiments of the present invention describe, rather than limit, the technical spirit of the present invention, and the scope of the present invention is not limited by these embodiments. It should be noted that the scope of the present invention is defined by the claims rather than the description of the present invention, and the meanings and ranges of the claims and all modifications derived from the concept of the equivalents thereof fall within the scope of the present invention.

What is claimed is:

1. An apparatus for generating a best-view image centered on an object of interest in multiple camera images, the apparatus comprising:

an object region detector configured to detect object regions in multiple camera images which are captured by multiple cameras tracking an object of interest;

an object of interest identification section configured to identify the object of interest corresponding to an object of interest identifier (ID) among objects in the detected object regions and extract object of interest regions;

a judgment criterion value calculator configured to calculate best-view judgment criterion values for each image frame among image frames of the multiple camera images with respect to the object of interest regions extracted by the object of interest identification section, calculate change amounts of object of interest regions between adjacent image frames among the image frames, and calculate best-view judgment criterion values based on inter-frame continuity, wherein the best-view judgment criterion values calculated for each image frame include an amount of activity based on silhouettes of the object of interest, $S_t^i$, a degree of face visibility of the object of interest, $F_t^i$, a degree of image blurring, $B_t^i$, and a degree of occlusion between the silhouettes of the object of interest and another object, $O_t^i$; and an image selector configured to select best-view images according to the image frames using a weighted sum of the best-view judgment criterion values calculated for each image frame, wherein the weighted sum is calculated by an equation $BV_t^i = S_t^i + F_t^i - B_t^i - O_t^i$, wherein $BV_t^i$ is a quantitative criterion value for determining frame-specific best views, i is a camera number, and t is a frame number, and wherein the image selector is configured to select a camera image having a highest value among the multiple camera images as a best-view image on the basis of the calculated quantitative criterion value, $BV_t^i$;

wherein the judgment criterion value calculator is configured to:

calculate the amount of activity based on the silhouettes of the object of interest, $S_t^i$, by extracting the silhouettes of the object of interest from the extracted object of interest regions, overlapping silhouettes, among the extracted silhouettes, extracted during a preset time, and using a number of white pixels and a number of grey pixels in a region in which the extracted silhouettes overlap;

calculate the degree of face visibility of the object of interest, $F_t^i$, by detecting whether there is a front face of the object of interest in the extracted object of interest regions, assigning a face present value in response to the front face being detected in the object of interest region, and assigning a face absent value in response to the front face being undetected in the object of interest region;

calculate the degree of image blurring, $B_t^i$, by converting images including the extracted object of interest regions from a first color space to a second color space, extracting hue pixel values from the converted color space, and calculating a difference in hue pixel values between the adjacent image frames; and calculate the degree of occlusion between silhouettes of the object of interest and the other object, $O_t^i$, by setting an overlap reference region based on an object silhouette and using the set overlap reference region.

2. The apparatus of claim 1, wherein, to calculate the degree of occlusion between silhouettes of the object of interest and the other object, $O_t^i$, the judgment criterion value calculator determines that silhouettes of the object of interest and the other object overlap, in response to determining that the other object overlaps the object of interest by determining which one of the object of interest and the other object is in front of the other.

3. The apparatus of claim 1, wherein, to calculate the degree of occlusion between silhouettes of the object of interest and the other object, $O_t^i$, the judgment criterion value calculator extracts the silhouettes of the object of interest and the other object from each frame of the camera images and determines a time point at which center points of regions of the other object extracted from a previous frame are included in a silhouette region in which the extracted silhouettes of the object of interest and the other object merge together as an overlap-start time point.

4. The apparatus of claim 1, wherein, to calculate the degree of occlusion between silhouettes of the object of interest and the other object, $O_t^i$, the judgment criterion value calculator determines a time point at which a center point of a region of the other object is removed from an object of interest region of a previous frame among silhouette regions of the object extracted from a current frame as an overlap-end time point.

5. A method of generating a best-view image centered on an object of interest in multiple camera images, the method comprising:

detecting object regions in multiple camera images captured by multiple cameras tracking an object of interest;

identifying the object of interest corresponding to an object of interest identifier (ID) among objects in the detected object regions and extracting object of interest regions;

calculating best-view judgment criterion values for each image frame among image frames of the multiple camera images according to the camera images with respect to the extracted object of interest regions, calculating change amounts of object of interest regions between adjacent image frames among the image frames, and calculating best-view judgment criterion values based on inter-frame continuity, wherein the best-view judgement criterion values calculated for each image frame include an amount of activity based on silhouettes of the object of interest, $S_t^i$, a degree of face visibility of the object of interest, $F_t^i$, a degree of image blurring, $B_t^i$, and a degree of occlusion between the silhouettes of the object of interest and another object, $O_t^i$; and selecting best-view images according to the image frames using a weighted sum of the best-view judgment criterion values calculated for each image frame, wherein the weighted sum is calculated by an equation $BV_t^i = S_t^i + F_t^i - B_t^i O_t^i$, wherein $BV_t^i$ is a quantitative criterion value for determining frame-specific best views, i is a camera number, and t is a frame number, and wherein the selecting of the best-view images comprises selecting a camera image having a highest value among the multiple camera images as a best-view image on the basis of the calculated quantitative criterion value, $BV_t^i$ wherein the calculating of the best-view judgment criterion value includes:

calculating the amount of activity based on the silhouettes of the object of interest, $S_t^i$, by extracting the silhouettes of the object of interest from the extracted object of interest regions, overlapping silhouettes, among the extracted silhouettes, extracted during a preset time, and using a number of white pixels and a number of grey pixels in a region in which the extracted silhouettes overlap;

calculating the degree of face visibility of the object of interest, $F_t^i$, by detecting whether there is a front face of the object of interest in the extracted object of interest regions, assigning a face present value in response to the front face being detected in the object of interest region, and assigning a face absent value in response to the front face being undetected in the object of interest region;

calculating the degree of image blurring, $B_t^i$, by converting images including the extracted object of interest regions from a first color space to a second color space, extracting hue pixel values from the converted color space, and calculating a difference in hue pixel values between the adjacent image frames; and calculating the degree of occlusion between silhouettes of the object of interest and the other object, $O_t^i$, by setting an overlap reference region based on an object silhouette and by using the set overlap reference region.

6. The method of claim 5, wherein the calculating of the degree of occlusion between silhouettes of the object of interest and the other object, $O_t^i$, comprises determining that silhouettes of the object of interest and the other object overlap, in response to determining that the other object overlaps the object of interest by determining which one of the object of interest and the other object is in front of the other.

7. The method of claim 5, wherein the calculating of the degree of occlusion between silhouettes of the object of interest and the other object, $O_t^i$, comprises extracting silhouettes of the object of interest and the other object from each frame of the camera images and determining a time point at which center points of regions of the other object extracted from a previous frame are included in a silhouette region in which the extracted silhouettes of the object of interest and the other object merge together as an overlap-start time point.

8. The method of claim 5, wherein the calculating of the degree of occlusion between silhouettes of the object of interest and the other object, $O_t^i$, comprises determining a time point at which a center point of a region of the other object is removed from an object of interest region of a previous frame among silhouette regions of the object extracted from a current frame as an overlap-end time point.

\* \* \* \* \*